Aug. 18, 1959     M. BRAYACK     2,899,867
SPOT FACING TOOL

Filed Aug. 23, 1956     2 Sheets-Sheet 1

INVENTOR.
MARK BRAYACK

BY
ATTORNEYS

Aug. 18, 1959 M. BRAYACK 2,899,867
SPOT FACING TOOL
Filed Aug. 23, 1956 2 Sheets-Sheet 2
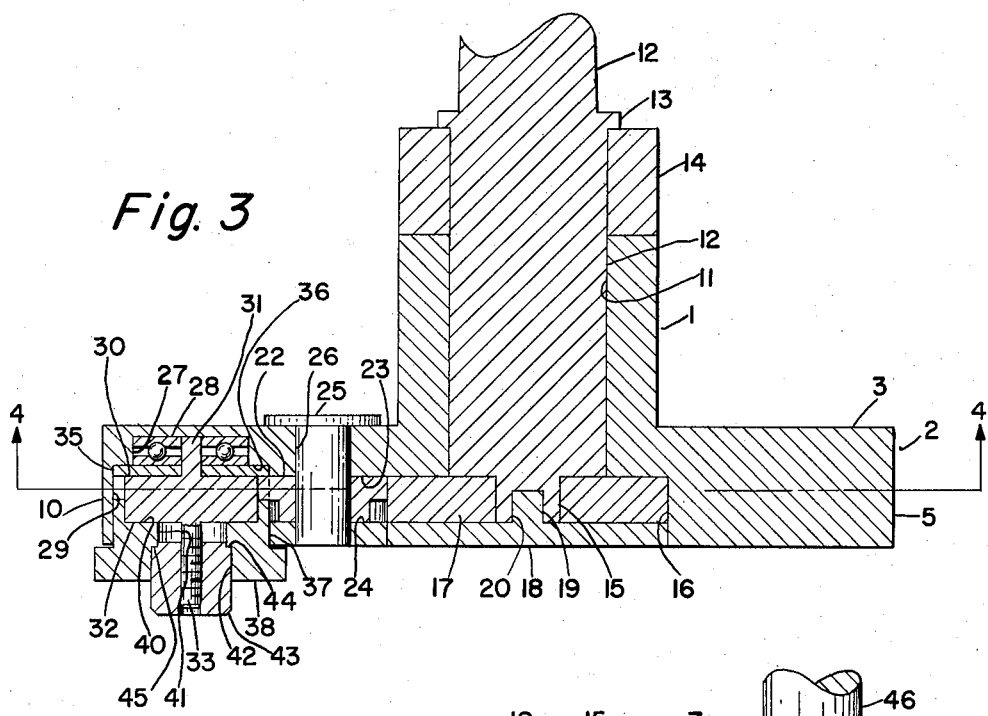
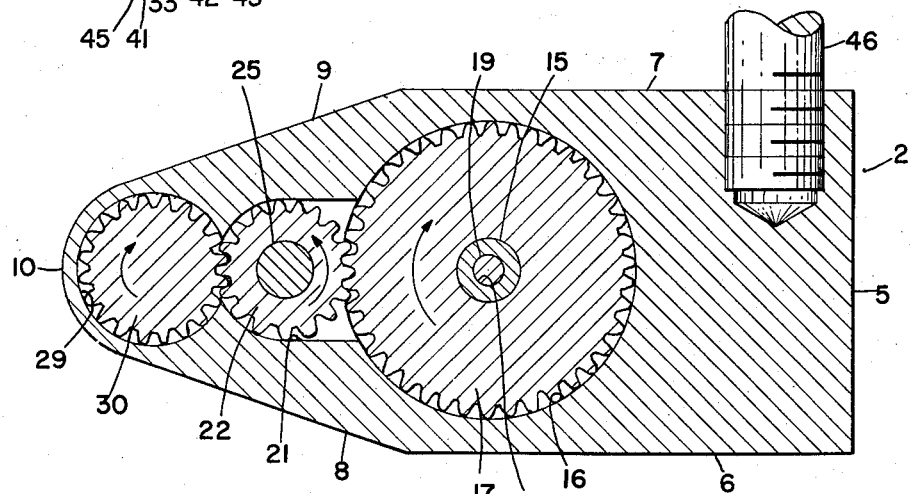
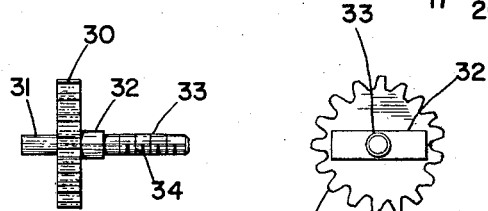 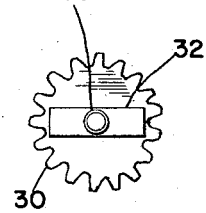
Fig. 8    Fig. 9
INVENTOR.
MARK BRAYACK
BY
ATTORNEYS

United States Patent Office 2,899,867
Patented Aug. 18, 1959

2,899,867

SPOT FACING TOOL

Mark Brayack, Cleveland, Ohio

Application August 23, 1956, Serial No. 605,776

1 Claim. (Cl. 90—11)

This invention relates, as indicated, to a spot facing tool, but has reference more particularly to a tool of this character which is especially adapted for spot facing areas which are difficult of access with conventional spot facing tools.

A primary object of the invention is to provide a tool of the character described, which is characterized by a facing cutter which is offset axially from the drive spindle of the tool, and in which the housing which contains the driving mechanism of the tool is of minimum depth.

Another object of the invention is to provide a tool of the character described, in which the housing is devoid, as far as possible, of openings into which oil and dirt can find access.

A further object of the invention is to provide a tool of the character described, in which a cutter drive spindle assembly of novel construction is employed.

Other objects and advantages of my invention will be apparent during the course of the following description.

In the accompanying drawings forming a part of this specification, and in which like numerals are employed to designate like parts throughout the same.

Fig. 3 is a cross-sectional view, on an enlarged scale, taken on the line 3—3 of Fig. 2;

Fig. 4 is a cross-sectional view, taken on the line 4—4 of Fig. 3;

Fig. 8 is a side elevational view of the cutter drive spindle, and

Fig. 9 is a bottom plan view of the cutter drive spindle.

Figure 1:
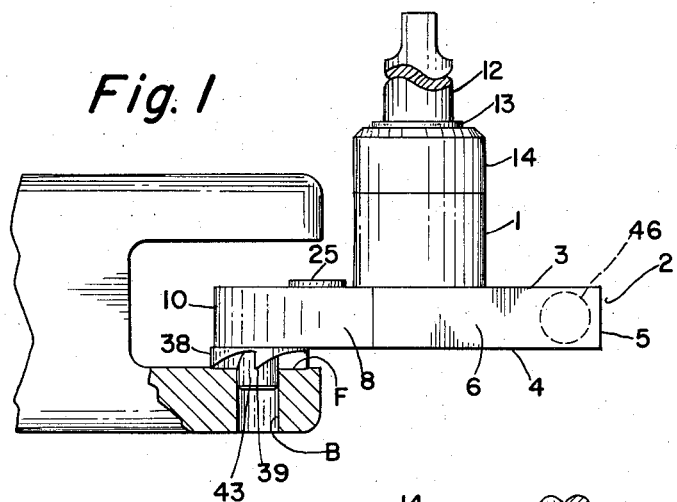
Fig. 1 is a side elevational view of a tool embodying the invention, and showing the manner in which the tool is used.
Figure 2:
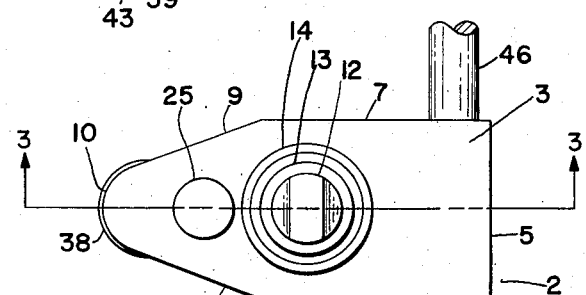
Fig. 2 is a top plan view of the tool.
Figure 5:
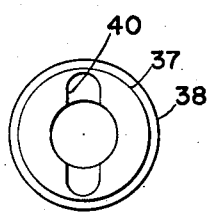
Fig. 5 is a top plan view of the cutter.
Figure 6:
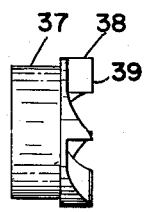
Fig. 6 is a side elevational view of the cutter.
Figure 7:
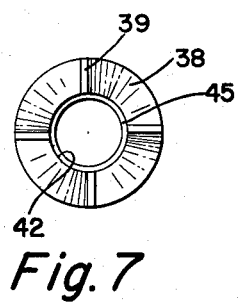
Fig. 7 is a bottom plan view of the cutter.

Referring more particularly to the drawings, the tool will be seen to comprise a housing consisting of a cylindrical portion 1 and an elongated flat portion 2 extending in a plane perpendicular to the axis of the portion 1, the portion 2 of the housing having a top face 3, a bottom face 4, a rear edge 5, parallel side edges 6 and 7, and side edges 8 and 9 which converge to form a rounded nose 10.

The portions 1 and 2 of the housing are provided with a bore 11, in which a drive spindle 12 is mounted for rotation. This spindle is maintained against downward displacement by means of a flange 13 of the spindle, which rests on a thrust bearing 14, which is keyed or otherwise secured to the spindle so as to be rotatable with the spindle.

The spindle 12 is provided with an axial extension 15 of reduced diameter, which extends into a counterbore 16 in the portion 2 of the housing, and has keyed or otherwise secured thereto a main drive gear 17. The counterbore 16 is closed at its lower end by means of a disk-like dirt seal 18, having an axial extension 19 which is press-fitted into a bore 20 of the extension 15.

The housing portion 2 is provided with a cavity 21 which extends radially from the counterbore 16 and is adapted to receive, by insertion through the counterbore, an idler gear 22 which is retained against axial displacement from the cavity 21 by the upper and lower walls 23 and 24 respectively, of the cavity 21.

The gear 22 is in mesh with the gear 17, and is retained in place by means of a spindle or pin 25 which extends through the gear 22 and about which the gear 22 rotates, the pin 25 being press-fitted in a bore 26 of the housing portion 2.

The nose portion of the housing 2 is provided with a bore 27, in which a thrust bearing 28 is mounted. The bore 27 is counterbored, as at 29, for the reception of a cutter drive spindle.

The cutter drive spindle comprises a gear 30 which meshes with the idler gear 22, an upper spindle extension 31 which extends through the thrust bearing 28, a key 32 which extends from the lower face of the gear 30 and diametrically across this face, and a lower spindle extension 33 which extends axially from the key 32, and is threaded as at 34. A thrust washer 35 is interposed between the gear 30 and a shoulder 36 at the junction of the bores 27 and 29.

Mounted in the counterbore 29, for rotation in said counterbore is a spot face cutter comprising a shaft 37 and head 38 provided with cutter teeth 39. The shaft 37 is provided in its upper end with an elongated slot 40 adapted to receive the key 32 of the gear 30, whereby the cutter is driven by the gear 30.

The cutter is provided with a central bore 41 through which the lower spindle extension 33 extends, and this bore is counterbored, as at 42, for the reception of a pilot 43, adapted to be threadedly secured to the extension 33. The pilot 43 has a smooth cylindrical surface, and is provided with a shoulder 44 adapted for abutment with a shoulder 45 of the cutter, whereby the relationship between the cutter and pilot is fixed or predetermined.

The tool is designed for spot facing holes in castings and the like, particularly holes which are not easy of access with conventional spot facing tools. Such a casting is shown in Fig. 1, in which the casting is provided with parallel portions, one of which overlies the other.

The lower portion has a hole or bore B, which is to be faced as at F with a cutter, such as the cutter of the invention. However, the upper portion of the casting, which overlies the hole, renders it impossible to face this hole by means of a cutter which is driven by a drive spindle which is in alignment with such a drive spindle.

By offsetting the cutter from the axis of the drive spindle in the manner provided by the tool of the present invention and by utilizing a gear drive system which has a relatively small depth, including a housing portion 2 of minimum depth, access to the hole for spot facing the latter is easily obtained.

In the spot facing operation, the drive spindle 12 is mounted in the chuck of a conventional drill press, and the casting is positioned on the bed or table of the drill press, in such a position that the pilot 43 is disposed within the hole which is to be spot faced, the pilot corresponding in diameter to the diameter of said hole. The spindle 12 is then driven, and the cutter teeth 39 brought into cutting relationship with the area of the casting which is to be faced.

In order to prevent the housing 1—2 from being turned by the torque action of the spindle 12, a torque rod 46 is secured to the housing and brought into abutment with a fixed abutment on the drill press, prior to the spot facing operation.

It will be apparent from the foregoing description that the tool is characterized by a facing cutter which is offset axially from the drive spindle of the tool, and that the housing 2 is of exceptionally small depth, so that the tool may be used in places which cannot be reached with conventional facing tools, as for example, that shown in Fig. 1.

By inserting the idler gear 22 through the counterbore 16 to its position within the cavity 21, the necessity of drilling extra holes in the housing is eliminated.

The cutter drive spindle assembly may be quickly and easily inserted in position, and is maintained in its position by means of the washer 35, which bears on the upper face of the idler gear 22. The washer 35 may be welded or brazed to gear 30 after the teeth have been cut in said gear. Since the pilot 43 is threaded to the spindle extension 33, the entire cutter assembly is maintained against axial displacement from the housing, after the assembly has been positioned, and the idler gear inserted in position. In this way, a large number of securing parts is eliminated. The lower end of the pilot 43 is preferably provided with a screw-driver slot for facilitating assembly of the cutter drive spindle assembly.

It is to be understood that the form of my invention, herewith shown and described, is to be taken as a preferred example of the same, and that various changes in the shape, size and arrangement of parts may be resorted to, without departing from the spirit of my invention, or the scope of the subjoined claim.

Having thus described my invention, I claim:

In a tool of the character described, including a housing having therein a drive gear, a driven gear and an intermediate idler gear, a cutter assembly including said driven gear having a threaded spindle extending axially from one face of the gear, a thrust washer secured to the other face of said gear and of a diameter larger than the root diameter of said gear, and a key extending from said first face of the gear, a cutter secured to said gear and having a recess to receive said key, said cutter having an axial opening through which the spindle extends, said opening having a counterbore, and a pilot threadedly secured to said spindle and having a portion extending into said counterbore and clamping the cutter to said gear, the thrust washer overlying said idler gear and maintaining the assembly in said housing.

References Cited in the file of this patent

UNITED STATES PATENTS

| | | |
|---|---|---|
| 1,312,033 | Huggins et al. | Aug. 5, 1919 |
| 1,515,548 | Cerotsky | Nov. 11, 1924 |
| 2,286,931 | Radeke | June 16, 1942 |
| 2,365,232 | Wert | Dec. 19, 1944 |
| 2,598,765 | Dewey | June 3, 1952 |
| 2,777,340 | Hettwer et al. | Sept. 28, 1955 |